United States Patent [19]

Yoshida et al.

[11] Patent Number: 4,656,466
[45] Date of Patent: Apr. 7, 1987

[54] ELECTRO-OPTIC DISPLAY DEVICE

[75] Inventors: Masaaki Yoshida, Tokyo; Ryoichi Yoshikawa, Kanagawa; Naoki Nagase, Tokyo; Masanori Yamada, Kanagawa, all of Japan

[73] Assignee: Canon Kabushiki Kaisha, Tokyo, Japan

[21] Appl. No.: 777,009

[22] Filed: Sep. 17, 1985

Related U.S. Application Data

[63] Continuation of Ser. No. 398,184, Jul. 14, 1982, abandoned.

[30] Foreign Application Priority Data

Jul. 24, 1981 [JP] Japan ................. 56-109889
Sep. 11, 1981 [JP] Japan ................. 56-143207
Oct. 6, 1981 [JP] Japan ................. 56-148408
Oct. 9, 1981 [JP] Japan ................. 56-150559
Oct. 9, 1981 [JP] Japan ................. 56-150560

[51] Int. Cl.$^4$ ............................................. G09G 3/18

[52] U.S. Cl. ................................. 340/716; 340/765;
340/753; 354/289.1; 354/472; 354/475
[58] Field of Search ............... 340/705, 716, 753, 754,
340/765; 354/289.11, 289.12, 472, 475; 455/159

[56] References Cited

U.S. PATENT DOCUMENTS

3,727,527  4/1973  Borowski et al. ............... 354/472
4,173,757  11/1979  Harenz et al. .................. 340/765
4,295,136  10/1981  Stoutenberg .................... 340/753
4,371,870  2/1983  Biferno ........................... 340/716
4,429,979  2/1984  Terada ........................... 354/289.1

Primary Examiner—Gerald L. Brigance
Attorney, Agent, or Firm—Toren, McGeady & Goldberg

[57] ABSTRACT

A display device in which display contents to be displayed by a display element such as a liquid crystal, as well as display portions and display forms can be recognized and display patterns can be easily recognized in cases where complicated photographing information is displayed.

14 Claims, 18 Drawing Figures

ELECTRO-OPTIC DISPLAY DEVICE

This is a continuation of application Ser. No. 398,184, filed July 14, 1982 now abandoned.

BACKGROUND OF THE INVENTION

1. Field of the Invention

The present invention refers to display devices, particularly such devices using an electro-optic device such as a liquid crystal.

2. Description of the Prior Art

Until now the display element, such as a liquid crystal or an electrochromic element, becomes transparent when no proper driving signal is applied, namely, at the non-driven time, so that it is impossible to know the content of the information to be displayed by the element in advance, which is inconvenient.

Particularly where the photographing information is displayed by this kind of display device, in order to carry out photography quickly, it is very desirable that the photographing information to be displayed is known in advance and that the display pattern is easy to observe.

It is accordingly an object of the present invention to provide an improved electro-optic display device which overcomes the disadvantages of the prior art devices.

It is another object of the invention to provide a display device in which the display contents by a display element, such as a liquid crystal, as well as the display positions and the display forms, can be recognized in advance.

It is a further object of the invention to provide a display device in which the display contents by a display element, such as a liquid crystal, can be easily recognized in advance.

These and further objects and features of the invention will become apparent from the description of embodiments thereof made with reference to the accompanying drawings.

SUMMARY OF THE INVENTION

It has now been found that these objects of the invention may be obtained in an electro-optic display device which includes a front transparent substrate, a rear substrate, and an electro-optical material disposed between the front and rear substrates. First and second electrical conductors are disposed respectively on the inside surfaces of the front and rear substrates. The first conductor is transparent and at least one of the conductors includes a pattern defining an image to be displayed. The apparatus also includes means for indicating in advance the pattern of the image to be displayed. The indicating means is disposed at substantially the same position as the image displayed and is arranged so that the image to be displayed is substantially not shaded.

BRIEF DESCRIPTION OF THE DRAWINGS

FIGS. 3(a) and (b) are schematic views for displaying the operation of the display device in FIG. 1.

FIGS. 10(a) and (b) are schematic views for explaining the operation of the display device in FIG. 8.

DESCRIPTION OF THE PREFERRED EMBODIMENTS

Figure 1:
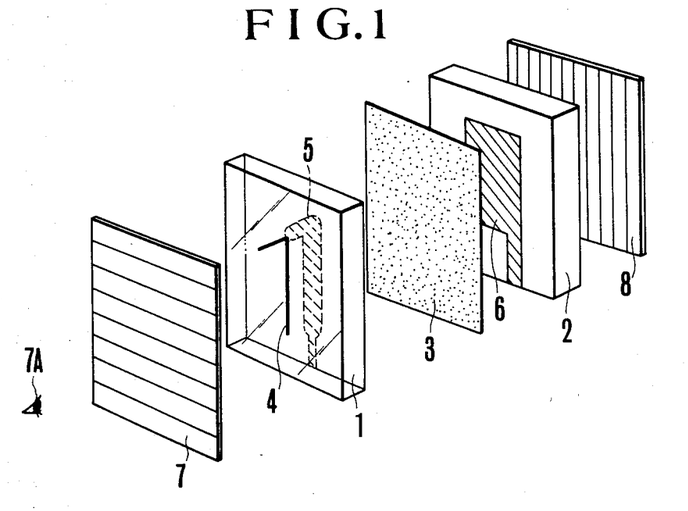
FIG. 1 is an exploded perspective view of the display device in an embodiment of the present invention.
Figure 2:
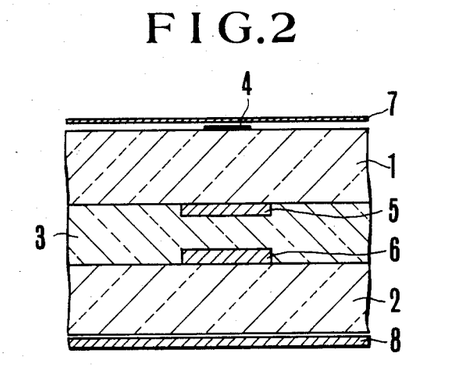
FIG. 2 is a sectional view of the display in FIG. 1.

FIG. 1 shows an exploded perspective view of an embodiment of the liquid crystal display device of the present invention. In the drawing, a conventional transparent glass is identified by the reference numeral 1. On one surface which is metallized (vapor deposited) is a transparent electrode 5 in the form of the numeral "1", and on the other surface is printed the numeral "1", indicated by the reference numeral 4, in smaller form at a position corresponding to or substantially registered to the transparent electrode 5. A conventional liquid crystal 3 is provided between the transparent glass plate 1 and a transparent glass plate 2. The plate 2 is the aforementioned conventional transparent glass plate, on whose surface facing the liquid crystal is a transparent electrode 6 making a pair, i.e., generally registered with the above transparent metallized electrode 5. A conventional polarization plate 7 is provided at the side of an eye 7A of a user. To the electrodes 5 and 6, alternating voltage is applied in the conventional way. Furthermore, the above elements 1-8 are superimposed over each other, as is shown in FIG. 2. In the above embodiment, the transparent electrode 6 has a rectangular shape, but it may have the same shape as the transparent electrode 5.

The operation of the liquid crystal display device composed as above will be explained in accordance with FIGS. 1, 2, 3(a) and 3(b).

When no driving voltage is applied between the transparent electrodes 5 and 6, and when the switch (not shown) is open, the numerical value formed with the electrodes 5 and 6 does not become visible due to the nature of the liquid crystal. However, on the surface of the glass plate 1 of a device 9, the numerical value "1", 4 has been printed in advance, while the light reaches the eye of the user 7A via the polarization plate 7. At this time the user 7A can understand in advance the content of the figure of the liquid crystal formed with the electrodes 5 and 6. Hereby, FIG. 3(a) shows such a non-driven display.

Figure 3:
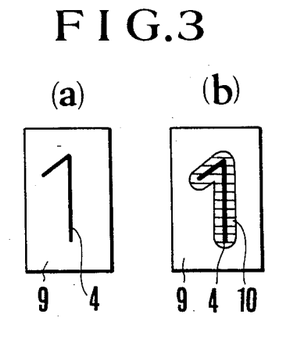

Then when an alternating driving voltage is applied between the electrodes 5 and 6 from a power source (not shown), and the power source switch is closed, FIG. 10 of the liquid crystal formed with the electrodes 5 and 6 appears and the user 7A is able to recognize the liquid crystal FIG. 10, as is shown in FIG. 3(b). Because the printed FIG. 4 is smaller than the liquid crystal FIG. 10, the parallax due to the thickness of the transparent glass plate 1 or the positional difference between the printed figure and the liquid crystal figure is avoided in such a manner that a display which is remarkably easy to look at is achieved.

Figure 4:
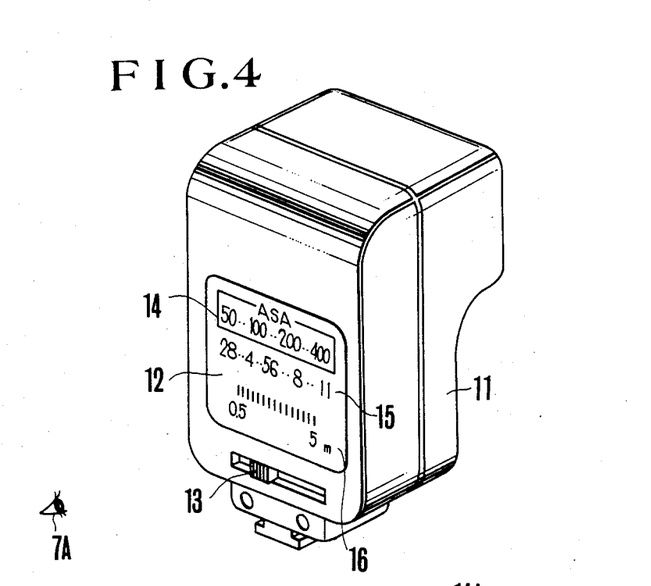
FIG. 4 is a perspective view of the electronic flash light device in an embodiment of the present invention.

FIG. 4 shows a perspective view of the electronic flash light device of the present invention. In the drawing, a case 11 and a display part 12 are provided at the back of the electronic flash light device, whereby the display part 12 consists of a film sensitivity display part 14 in which the ASA values 50–400 are on a line, the aperture values display part in which the aperture values 2.8–11 are on a line, and a photographing distance range display part 16 in which the photographable distance ranges are in stick-shaped members. Each of these display parts 14 and 15 consists of a certain determined number of liquid crystal display members arranged in parallel. A slide switch 13 sets the film sensitivity.

The operation, particularly the display operation of the flash light device, will be explained in accordance with FIGS. 4 to 7.

Figure 5:
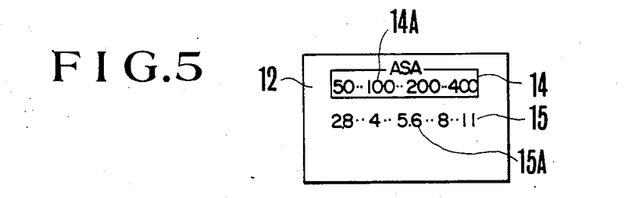
FIGS. 5 to 7 are schematic views for explaining the operation of the flash light device in FIG. 4.

In FIG. 5, when no driving voltage is applied between the liquid crystal display elements constituting the display parts 14 and 15, only the printed figures of the liquid crystal display element of the display parts 14 and 15 are visible to the user 7A in the same way as in the first embodiment. Display of a photographing distance range display part 16, shown in FIG. 4, is not carried out at this time. Although the display is carried out when the driving voltage is applied, it is not necessary to utilize liquid crystals because the photographing distance range is a determined value (between 0.5–5 m).

Figure 6:
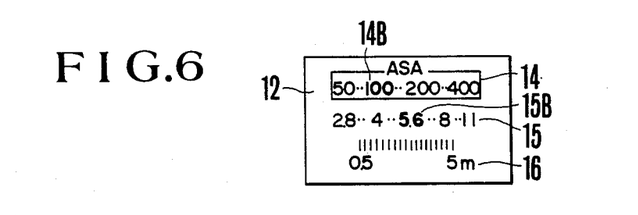

Then, when the driving voltage is applied to the liquid crystal elements constituting the display parts 14 and 15, the parts 14 and 15 carry out the display as follows. That is, when a film with ASA100 sensitivity is used and the sensitivity is set with a slide switch 13, only the printed FIGS. 14A representing the ASA100 become thick figures and the liquid crystal FIGS. 14B representing the ASA100 become visible, while only the printed FIGS. 15A representing F5.6 become thick, whereby the liquid crystal FIGS. 15B representing the aperture value of F5.6 become visible. Furthermore, when the sensitivity of ASA200 is set, only the printed figures representing ASA200 and F8 become thick and the liquid crystal figures corresponding to the respective information visible.

Figure 7:
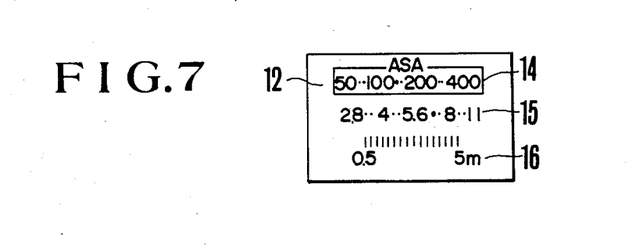

Furthermore, when the set sensitivity is in-between ASA100 and ASA200, only the dot for displaying the middle step of ASA in the middle of ASA100 and ASA200 corresponding to the set ASA sensitivity is displayed thickly, and only the dot for displaying the middle step of the aperture value between F5.6 and F8 is displayed thickly, as is shown in FIG. 7. Thereby, it is not necessary to use a small numerical display which is hard to recognize.

In the present embodiment the display content of the display body, such as a liquid crystal, can be seen at a glance in advance. While the display body is driven, a display which is remarkably easy to recognize can be obtained because the printed display member is positioned in the figures without positional difference.

Furthermore, for example in ASA125, ASA160 between ASA100 and ASA200 or F6.35 and F7.13 between F5.6 and F8, which are not normally used, the values are displayed in dot by $\frac{1}{3}$ step.

Furthermore, although the above embodiment refers to figures which are printed on the transparent glass of the liquid crystal display element, the present invention is not limited hereto and the same effect can be obtained even when the figures are printed on the polarization plate.

Figure 8:
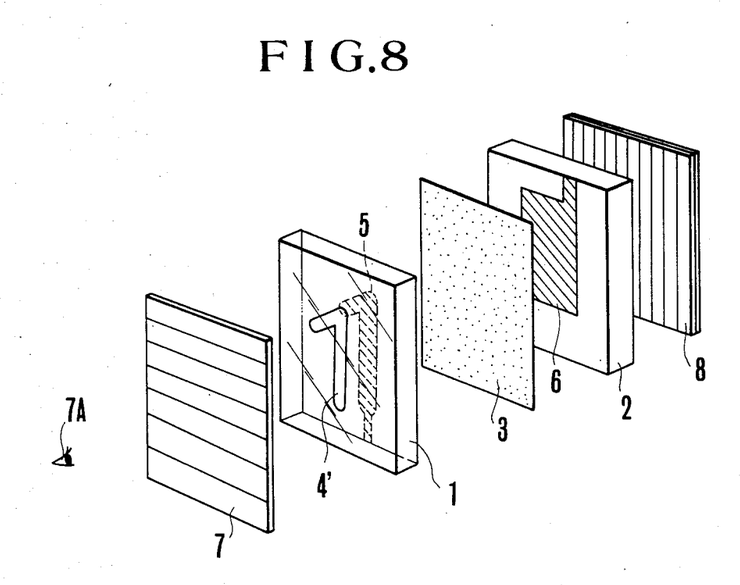
FIG. 8 is an exploded perspective view of a second embodiment of the display device of the present invention.
Figure 9:
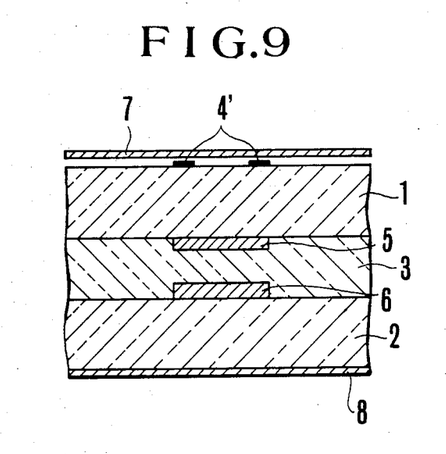
FIG. 9 is a sectional view of the display device in FIG. 8.

FIG. 8 shows an exploded perspective view of a second embodiment of the liquid crystal display device of the present invention. The liquid crystal display device is composed almost in the same way as in the first embodiment in FIG. 1. The members having the same figures as those in FIG. 1 are the same members. In the drawing, the conventional transparent glass plate is identified by the reference numeral 1, on whose first surface a transparent electrode 5 in the form of the numerical value "1" is metallized (vapor deposited) and on whose other surface an outlined FIG. 4' is printed to show the size of the display figures. The conventional liquid crystal 3 is provided between the above transparent glass plate 1 and another transparent glass plate 2. The above conventional transparent glass plate 2 has a surface facing the liquid crystal on which the transparent electrode 6 is metallized so as to make a pair with the transparent electrode 5. The conventional polarization plate is provided at the side of the user 7A and the reflector plate 8. Hereby, between the above electrodes 5 and 6, an alternating voltage is applied in the conventional method. The above elements 1–8 are superimposed, as shown in FIG. 9.

The operation of the liquid crystal display device composed as above will be explained in accordance with FIGS. 8, 9, 10(a) and 10(b).

When no driving voltage is applied between the transparent electrodes 5 and 6 and when power source (not shown) is not closed, the numerical value formed with the electrodes 5 and 6 is not visible due to the nature of the liquid crystal. However, because on the surface of the transparent glass plate 1 of the device 9 a numeral "1" in the form of an outlined figure, identified by the release numeral 4, is printed in advance, the light reflected herefrom reaches the eye of the user 7A and, therefore, the user can recognize the content, the form and the position of the liquid crystal figure formed with the electrodes 5 and 6. FIG. 10(a) shows such a non-driven display.

Figure 10:
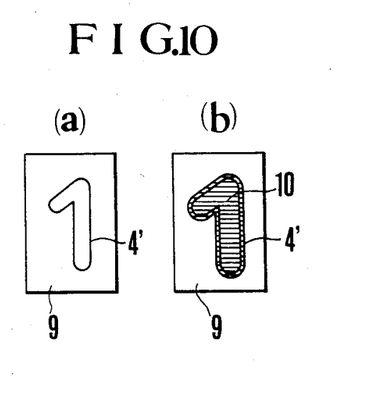

Then when an alternating driving voltage is applied between the electrodes 5 and 6 from the power source (not shown), and when the power source switch is closed, the liquid crystal FIG. 10 formed with the electrodes 5 and 6 appear and the user 7A can recognize the thick liquid crystal FIG. 10 as is shown in FIG. 10(b), namely, the outlined FIG. 4' filled inside.

Figure 11:
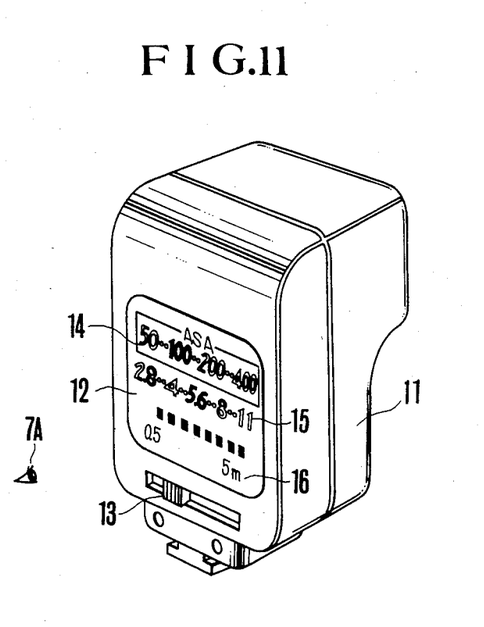
FIG. 11 is a perspective view of the electronic flash light device in the second embodiment of the present invention.

FIG. 11 is a perspective view of the electronic flash light device of the present invention, whereby the construction and the operation of the display part of the electronic flash light device are almost the same as those of FIG. 4.

In the above second embodiment the display content and the display form of the display body, such as liquid crystal, can be recognized in advance. When the display body such as liquid crystal is driven, the figure of the display body is displayed thicker than other outlined figures so that a remarkably easily observed display can be obtained.

The above embodiment refers to an outlined figure printed on the transparent glass plate of the liquid crystal display element. The present invention is not limited to the above. The same effect can be obtained even when the figure is printed on another glass plate or on the front or the back surface of the polarization plate.

Figures 12, 13:
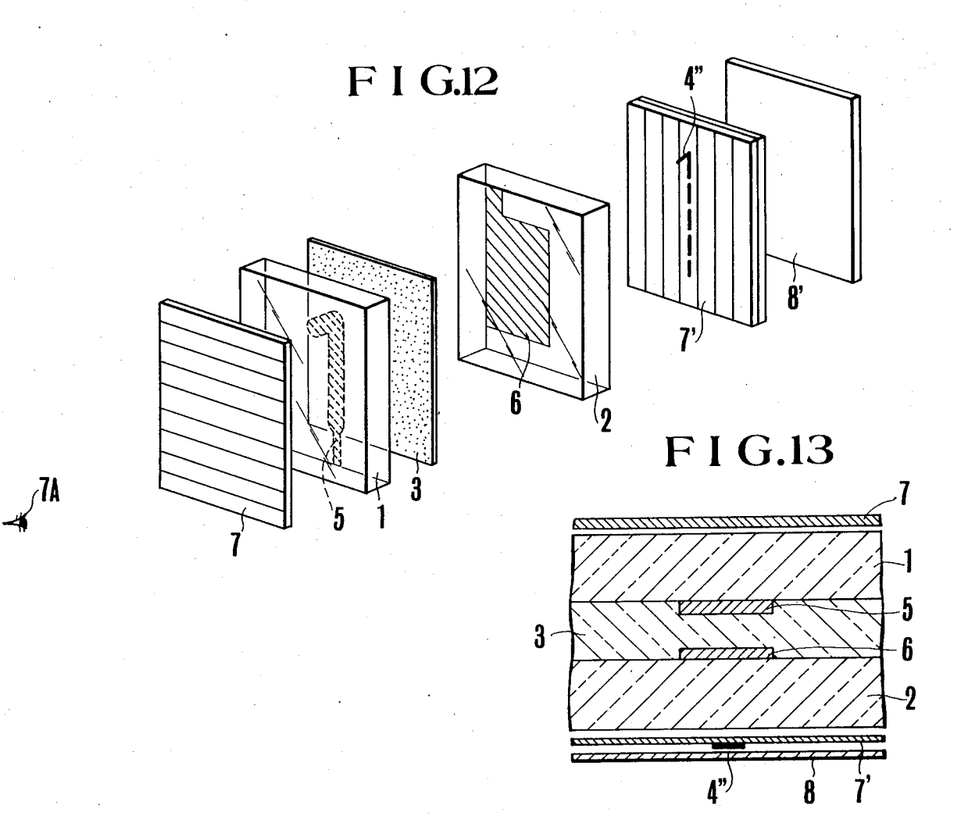
FIG. 12 is an exploded perspective view of the third embodiment of the present invention.
FIG. 13 is a sectional view of the display device in FIG. 12.

FIG. 12 shows the third embodiment of the liquid crystal display device of the present invention in an exploded perspective view. In the drawing is the conventional transparent glass plate 1, on which a transparent electrode 5 in the form of the numeral "1" is metallized (vapor deposited). The conventional liquid crystal 3 is provided between the transparent glass plate 1 and the other transparent glass plate 2. The conventional transparent glass plate 2 has on the surface at the side of the liquid crystal a transparent electrode 6 which is metallized and disposed in substantially registered relation so as to make a pair with the above transparent electrode 5.

A conventional polarization plate 7' faces the polarization plate 7 on which the numeral "1" indicated by reference numeral 4 is printed at the position corresponding to the electrode 5. A reflector plate is identified by the reference numeral 8'.

An alternating voltage is applied between the above electrodes 5 and 6 in the conventional way.

Furthermore, the above elements 1–8 are superimposed, as is shown in FIG. 13.

The operation of the liquid crystal display device composed as described above will be explained below in accordance with FIGS. 12, 13 and 14.

When no driving voltage is applied between the transparent electrodes 5 and 6, the power source switch (not shown) is not closed, the numerical value formed with the electrodes 5 and 6 is not visible due to the nature of the liquid crystal. However, on the back surface of the device 9, the numeral "1", identified by the reference numeral 4", is printed in advance and the light reflected therefrom reaches the eye of the user 7A via the transparent glass plate 2, the transparent electrode 6, the liquid crystal 3, the transparent glass plate 1, the transparent electrode 5 and the polarization plate 7 so that at this time the user 7A can also recognize in advance the content of the liquid crystal formed with the electrodes 5 and 6.

Figure 14:
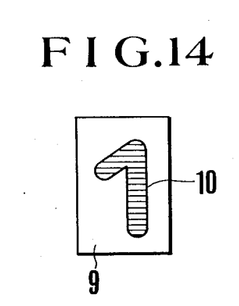
FIG. 14 is a schematic view for explaining the operation of the device in FIG. 12.

When an alternating driving voltage is applied between the electrodes 5 and 6 from the power source (not shown), the power source switch is closed, the liquid crystal letter 10 formed with the electrodes 5 and 6 appears and the users 7A can recognize the liquid crystal letter 10, as is shown in FIG. 14. At this time, the liquid reflected from the printed letter 4" is shaded with the liquid crystal display elements 1, 2, 3, 5, 6, 7 and 7' so that the printed letter 4" can hardly be recognized.

Consequently, a display remarkably easy to recognized can be obtained, which is quite different from the display of the device of the first and the second embodiments.

Figure 15:
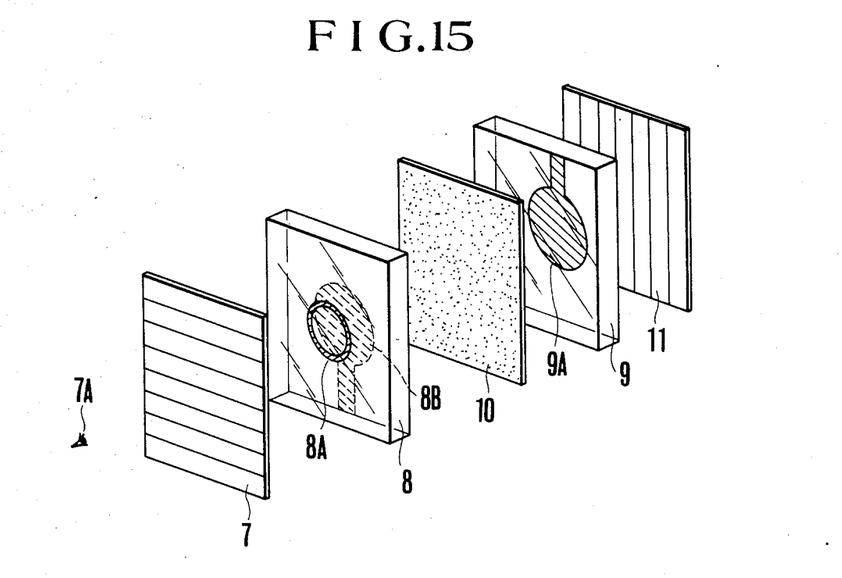
FIG. 15 is an exploded perspective view of the liquid crystal display element constituting the dot display part of the middle step of the ASA and the aperture value display part in FIGS. 4–11.

Hereby, the letter 4" on the polarization plate 7' can be painted a different color in the liquid display. In this case the color of the printed letter is different from that of the liquid crystal display letter so that it can easily be judged whether the liquid crystal display element is driven or not. In the above embodiment, the letter is printed on the polarization plate 7' of the liquid crystal display element, whereby the same effect can be obtained even when the letter is printed in the reflector plate 8'. FIG. 15 shows the liquid crystal display element constituting the dot display part of the middle step of the ASA and the aperture value display part of the flash light device in FIGS. 4 and 11. The polarization plate 7 is provided on the surface, and behind the polarization plate 7 is provided the transparent glass plate 8 having a printed cylindrical display member 8A making a part of the dot on the front surface and a transparent electrode 8B making a part of the above dot on the rear surface.

The transparent glass plate is identified by the reference numeral 9, on whose surface a transparent electrode 9A is similarly shaped to 8A and 8B metallized at the position corresponding to 8A and 8B. The liquid crystal 10 is provided between the transparent glass plates 8 and 9, and the polarization reflector plate 11 is provided behind the transparent glass plate 9.

Figure 16:
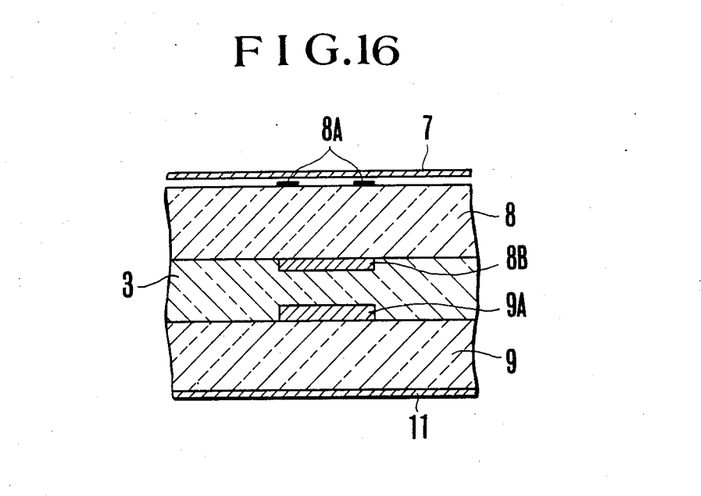
FIG. 16 is a sectional view showing the liquid crystal display element in FIG. 15.

The elements shown in FIG. 15 are superimposed as is shown in FIG. 16.

Figure 17:
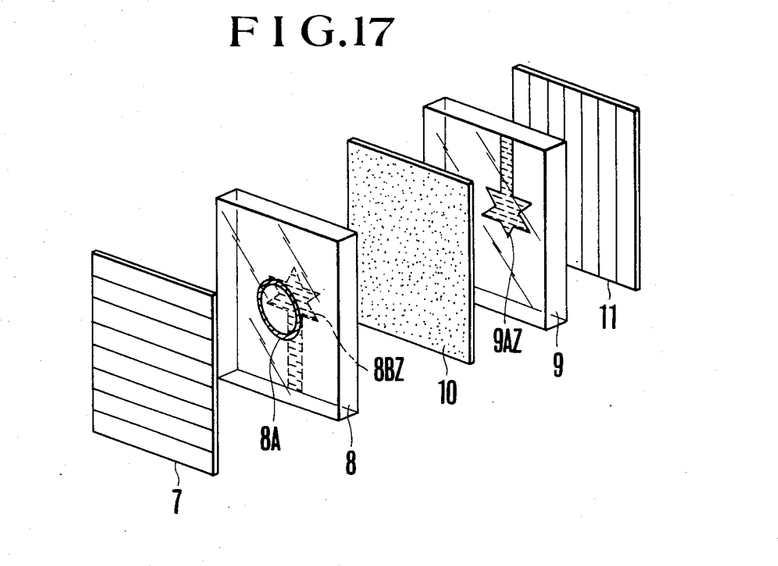
FIG. 17 is an exploded perspective view of the liquid crystal display element constituting a variation of the dot display part of the middle step in FIG. 15.
Figure 18:
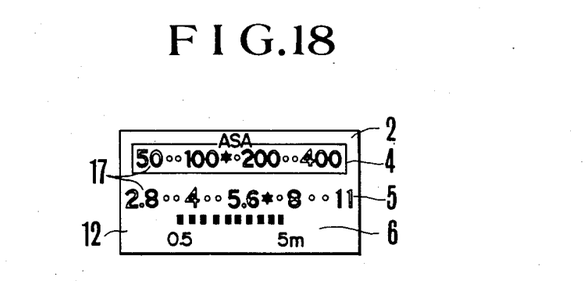
FIG. 18 is a schematic view for explaining the operation of the display device in which the dot display element in FIG. 17 is used.

FIG. 17 shows a variation of the dot display part of the middle step shown in FIG. 15. Transparent electrodes 8BZ and 9AZ are star-shaped in such a manner that the dot can easily be recognized. Other compositions than the shape of the transparent electrodes 8BZ and 9BZ are the same as those of the embodiment shown in FIG. 17. Also, in this variation, when the photographing information to be set are the middle values of the information, the driving voltage is applied to the dots corresponding to the middle values in such a manner that only the dots can be recognized. For example, when the film sensitivity is ⅓ step above ASA100 and the aperture value is ⅓ step above F5.6, the display is as shown in FIG. 18.

In the above embodiment, the letter is printed on the transparent glass plate of the liquid crystal display element, whereby the same effect can be obtained even when the letter is printed on the front or the reat surface of the polarization plate in contact with the reflector plate of the polarization reflector plate. Furthermore, in the above embodiment, the figure (for example, 8A) is provided with printing, whereby it is possible to provide the above figure by fixing, for example, a film bearing the figure on a glass plate.

What we claim:

1. An electro-optic display device comprising:
a front transparent substrate;
a rear substrate, and an electro-optical material disposed between said front and rear substrates;
first and second electrical conductors disposed respectively on the inside surfaces of said front and rear substrates, said first conductor being transparent;
first means for selectively providing an optional image, said optional image defining a certain zone and being formed by at least one of the conductors; and
second means forming a non-transparent pattern comprising a permanent image similar to the optional image selectively provided by the first means, said pattern being formed in an optical path from front to rear substrates inside the zone of the optional image selectively provided by said first means.

2. A device according to claim 1, wherein said second means is printed on said front transparent substrate.

3. A device according to claim 1 wherein said electro-optical material is a liquid crystal.

4. A device according to claim 1, further comprising:
a polarizer and a relector both being disposed in turn, in the rear of said rear substrate, wherein said second means is disposed in an optical path from said electro-optical material to said reflector.

5. An electro-optic display device comprising:
a front transparent substrate;
a rear substrate, and an electro-optical material disposed between said front and rear substrates;
first and second electrical conductors disposed respectively on the inside surfaces of said front and rear substrates, said first conductor being transparent;
first means for selectively providing an optional image for display, said optional image being formed by at least one of the conductors; and
second means forming a non-transparent pattern comprising a permanent image similar to the optional image to be displayed by the first means, said pattern being formed at a position in an optical path from front to rear substrates on a surface of the substrate opposite to the surface on which said optional image is formed.

6. A device according to claim 5, wherein said second means is printed on said front transparent substrate.

7. A device according to claim 5, wherein said electro-optical material is a liquid crystal.

8. An electro-optic display deivice for a photographic information, comprising:
first means for selectively providing an optional image for display of photographic information, said optional image defining a certain zone and being formed by conductors; and
second means forming a non-transparent pattern comprising a permanent image similar to the optional image for display of photographic information, said pattern being formed at a position in an optical path inside said zone of the optional image for display of photographic information.

9. A device according to claim 8, wherein said photographic information is numerical.

10. A device according to claim 8, wherein said photographic information is a design figure.

11. An electro-optic display device for a photographic information, comprising:
first means for selectively providing an optional image for display of photographic information, said optional image defining a certain zone and being formed by conductors, the conductors being arranged on one surface of at least two opposing substrates; and
second means forming a non-transparent pattern comprising a permanent image similar to the optional image to be displayed by the first means said non-transparent pattern being formed on an opposite surface of at least one of the substrates and within an optical path inside the zone of said optional image.

12. A device according to claim 11, wherein said photographic information is numerical.

13. A device according to claim 11, wherein said photographic information is a design figure.

14. An electro-optic display device for a photographic information, comprising:
first means for selectively providing an optional figured image for display of photographic information, said image having a certain zone and being formed by conductors; and
second means forming a non-transparent pattern comprising a permanent image different from the optional image selectively provided by the conductors of said first means and formed at a position in an optical path within the zone of the optional image selectively provided by said first means.

* * * * *